United States Patent Office 3,671,316
Patented June 20, 1972

3,671,316
METHOD FOR SEPARATING FRUCTOSE AND GLUCOSE FROM SUGAR SOLUTION CONTAINING FRUCTOSE AND GLUCOSE THEREIN
Ryoki Tatuki, 16 Azo Teramachi,
Goshogawara, Japan
No Drawing. Filed Feb. 1, 1971, Ser. No. 111,622
Claims priority, application Japan, Feb. 6, 1970, 45/10,012
Int. Cl. C13k 3/00
U.S. Cl. 127—46 R                  5 Claims

ABSTRACT OF THE DISCLOSURE

Method for the separation of glucose from fructose in a solution thereof which involves complexing the glucose with sodium chloride. The complex containing the glucose is crystallized out of solution and separated as by filtration.

---

This invention relates to a method for separating fructose and glucose advantageously from the sugar solution containing fructose and glucose therein such as inverted sugar solution and isomerized sugar solution.

Recently, a method for separating fructose in the form of calcium chloride double salt thereof from the inverted sugar solution has been provided, however, such method is operationally and economically disadvantageous since a large quantity of methanol is needed to separate said double salt.

I have found that when pH of the sugar solution containing glucose and fructose is adjusted to from 7 to 9 and then sodium chloride is added to said sugar solution, glucose in the sugar solution is selectively converted to the double salt with sodium chloride substantially in yield of 100%, and consequently glucose can be advantageously separated from fructose in the sugar solution.

Primary object of this invention is to provide a method for separating fructose and glucose advantageously from the sugar solution containing them by simple procedure.

Another objects and advantages of this invention will be apparent from the following detailed description.

Although any sugar solution containing fructose and glucose can be used as the raw material according to the invention, in practice, the inverted sugar solution prepared by acid-treatment of sucrose or the isomerized sugar solution prepared by isomerization of glucose is preferably used.

The above sugar solution has to be adjusted to a pH of from 7 to 9 so as to separate glucose therein in the form of double salt by adding sodium chloride to said sugar solution. Alkaline substance, for example, sodium hydroxide may be added in order to adjust pH of the sugar solution. Amount of sodium chloride to be added to the sugar solution so as to form the double salt can be calculated as the amount being necessary for forming the double salt with glucose in the sugar solution, however, in practice an excess of sodium chloride is preferably added. For example, in the event of the invert, sugar prepared from 500 g. of sucrose, 180–200 g. of sodium chloride may be added. And then the double salt consisting of glucose and sodium chloride is separated by concentrating the sugar solution.

The above concentration of the sugar solution is generally preformed under vacuum, and the sugar solution is preferably concentrated to Brix 78%. After said double salt is separated, fructose and the excess sodium chloride remain in the sugar solution. In case of separating the double salt, according to this invention, fructose does not adhere to the double salt consisting of glucose and sodium chloride whereas according to the method employing calcium chloride (in the method fructose is separated in the form of double salt), glucose adheres to the double salt consisting of fructose and calcium chloride.

The double salt thus separated is dissolved in water and deionized to obtain glucose solution, and then the obtained glucose solution is concentrated and left as it is for 10–15 hrs. to obtain glucose crystal.

On the other hand, the sugar solution separated from the double salt is deionized and concentrated and then left as it is for 15–20 hrs. to obtain fructose crystal.

The result testing the effect of pH of the sugar solution on formation of sodium chloride double salt of glucose is given in the following tables:

TABLE I

| pH of invert sugar: | Yield (percent) of glucose in the double salt | Content (percent) of glucose in the sugar solution separated from the double salt |
|---|---|---|
| 3 | 50 | 50 |
| 4 | 55 | 45 |
| 5 | 65 | 35 |
| 6 | 75 | 25 |
| 7 | 85 | 15 |
| 8 | 95 | 5 |
| 8.5 | 100 | 0 |
| 9 | 95 | 5 |
| 10 | (¹) | (²) |
| 11 | (¹) | (²) |

¹ Suddenly decrease.
² Suddenly increase.

NOTE.—The above values were calculated in assuming that the invert sugar being composed of 50% of fructose and 50% of glucose.

TABLE II

| Amount (g.) of NaCl | Brix, percent | pH | Amount (g.) of the double salt | Amount (g.) of the sugar solution separated from the double salt |
|---|---|---|---|---|
| 180 | 78 | 5 | 266 | 553 |
| 180 | 78 | 6 | 294 | 485 |
| 180 | 78 | 7 | 323 | 441 |
| 180 | 78 | 8 | 350 | 448 |
| 180 | 78 | 8.5 | 378 | 436 |
| 180 | 78 | 9 | 358 | 441 |
| 180 | 78 | 10 | 344 | 439 |
| 180 | 78 | 11 | 325 | 489 |

TABLE III

| Amount (g.) of NaCl | Brix, percent | pH | Amount (g.) of the double salt | Amount (g.) of the sugar solution separated from the double salt |
|---|---|---|---|---|
| 200 | 78 | 5 | 308 | 473 |
| 200 | 78 | 6 | 326 | 468 |
| 200 | 78 | 7 | 342 | 437 |
| 200 | 78 | 8 | 353 | 453 |
| 200 | 78 | 8.5 | 405 | 420 |
| 200 | 78 | 9 | 376 | 416 |
| 200 | 78 | 10 | 346 | 439 |
| 200 | 78 | 11 | | |

NOTE.—In Tables II and III, the sugar solution (fructose solution) contained a little of glucose.

From the above tables, it will be apparent that amount of sodium chloride double salt of glucose was remarkably increased at over pH 7, especially, about pH 9 of the sugar solution as the raw material.

Accordingly, in the event of separating glucose in high yield from the sugar solution as the raw material, pH of the sugar solution is preferably adjusted to 8.5, on the other hand, when the aforesaid pH is adjusted to 4–8.0, fructose solution containing some glucose can be obtained (that is, some glucose without forming the double salt remains in the sugar solution separated from the double salt).

As stated above, according to this invention, fructose and glucose can not only be separated respectively from the sugar solution as the raw material but also fructose solution containing some glucose can be obtained. Therefore, this method can provide optionally pure fructose or fructose solution containing some glucose according to purpose for use of fructose. For example, for purpose of using fructose as a sweetening material of drinks, fructose solution containing some glucose seems to be more suitable.

Further, according to this invention, the sugar solution separated from the double salt itself can be utilized as a sweetening material since the salt used to form the double salt of glucose by this method is edible sodium chloride. Therefore, in the event of using said sugar solution as the sweetening material, it is not necessary to eliminate completely sodium chloride which remains in the sugar solution. When it is desirable to obtain pure fructose and glucose, the separated double salt may be dissolved in water and deionized so as to obtain pure glucose, on the other hand, the sugar solution separated from the double salt of glucose may be deionized to eliminate sodium chloride remaining therein. Procedures for such deionization include ion-exchange resin, electric dialyzer with ion-exchange membrane and combination of them.

As stated above, according to this invention, many advantages are given since each fructose and glucose can be separated from the sugar solution containing them by simple procedure employing sodium chloride available cheaply and further, fructose solution containing optional amount of glucose can be also prepared.

This invention will be illustrated by the following examples, which are given merely for illustration.

EXAMPLE 1

500 g. of sucrose was dissolved, under heating, in 1 l. of water, 3 cc. of 35% conc. HCl diluted with twice volume of water was added to said sugar solution and then the sugar solution was inverted for 90 minutes. After adjusting Brix of the invert sugar solution thus prepared to 42°, NaOH was added thereto to adjust pH 8.5.

200 g. NaCl was added to the invert sugar solution and the mixture was agitated to dissolve NaCl. The solution thus obtained was concentrated, under vacuum, until Brix thereof reached 78° and left as it is for 10-15 hrs. to crystallize the double salt consisting of sodium chloride and glucose. The crystallized double salt was separated through filter. There were obtained 405 g. of the double salt and 420 g. of the filtrate.

The filtrate was substantially composed of fructose, sodium chloride and water free from glucose.

The double salt of glucose and sodium chloride thus obtained was dissolved with the same quantity of water and then the solution thereof was deionized by ion-exchange resin system or dialyzer with ion-exchange membrane to prepare glucose solution. The glucose solution thus prepared was concentrated to separate glucose. On the other hand, the filtrate was deionized by the above similar procedure and concentarted to separate fructose.

EXAMPLE 2

Procedures of Example 1 were repeated except that pH of the invert sugar solution was adjusted to 7 and 180 g. and NaCl was used. There were obtained 323 g. of the double salt and 441 g. of the filtrate.

The filtrate was composed of fructose, sodium chloride, water and a little of glucose.

The double salt was subjected to the similar procedure described in Example 1 to separate glucose crystal. The filtrate was deionized according to the procedure of Example 1 to obtain fructose solution containing some glucose. After concentrating the fructose solution, there was obtained good syrup having superior sweetness.

What I claim is:

1. A method for the separation of fructose and glucose in a sugar solution containing fructos and glucose which comprises:
   (a) adjusting the pH of said sugar solution to from 7 to 9;
   (b) adding sodium chloride to the resulting sugar solution in an amount necessary to form a double salt of the glucose and sodium chloride; and
   (c) separating said double salt from said sugar solution.

2. The method of claim 1 in which the sugar solution is adjusted to a pH of about 8.5.

3. The method of claim 1 wherein the sodium chloride is added in excess of the amount required to form said double salt.

4. The method of claim 1 which further comprises removing and purifying glucose in the double salt by dissolving said salt in water and thereafter deionizing and then concentrating the resulting solution.

5. The method of claim 1 which further comprises removing and purifying the fructose in the sugar solution separated from the double salt by deionizing and concentrating said solution.

References Cited

UNITED STATES PATENTS 2,818,851   1/1958   Khym _____ 127—46

OTHER REFERENCES

"Advances in Carbohydrate Chemistry," M. L. Wolfrom, ed., vol. 21, 209-220, Academic Press, New York, 1966.

MORRIS O. WOLK, Primary Examiner

S. MARANTZ, Assistant Examiner

U.S. Cl. X.R.

127—41, 58